Patented Feb. 24, 1942

2,273,874

UNITED STATES PATENT OFFICE 2,273,874

MANUFACTURE OF ARTIFICIALLY COLORED GRANULES

Edwin M. Lines, Dedham, Mass., assignor to Bird & Son, inc., East Walpole, Mass., a corporation of Massachusetts No Drawing. Application June 17, 1939, Serial No. 279,689

9 Claims. (Cl. 91—70)

This invention relates to the manufacture of artificially colored granules and has to do principally with such granules for use in the provision of a mineral-surfaced roofing embodying an asphalt-saturated and coated base layer of felt or the like having superimposed thereon and adherent thereto granules of the class herein described.

Heretofore, various sorts of artificially colored granules have been proposed and made for roofing purposes, including granules having a fused silicate of soda constituent in the surface coatings of such granules. In many sorts of granules manufactured, however, in accordance with prior art methods, under certain moisture and temperature conditions, undesirable surface efflorescence or "blooming" takes place, which destroys not only the appearance, but in addition, the adherence of granules to the asphalt coating of the roofings, which, in turn, affects adversely both the appearance and life of said roofing. Any blistering or "blooming" of the exterior coating of the granules not only gives an undesirable discolored appearance on the exposed surface of the granules but also, if adjacent the asphaltic bond or surface of the roofing, tends to free the granules therefrom. Various efforts have been made to minimize "blooming" with more or less success, but such efforts have usually involved additional trouble and expense.

The herein described invention avoids the difficulties of the prior art and provides at low cost a highly successful granule of excellent color and one which results in the elimination of efflorescence or "blooming" and also avoids imperfect bonding to the asphalt coated surface of the roofing. I have discovered that these desirable results in the method and in the finished granules may be obtained by applying to the base granule of any suitable hard, weather-resistant material such as sand, quartz, gravel, rock, etc. an initial coating of finely powdered serpentine rock (hydrated magnesium silicate of approximate chemical formula $3MgO.2SiO_2.2H_2O$) and then applying thereto a silicate of soda coating, clear or pigmented as may be desired, and firing the same. The serpentine may or may not include crysotile asbestos. If desired, the pigment may be added in connection with the application of the powdered serpentine rock coating rather than in the sodium silicate solution. In either case, upon the firing, as hereinafter described, the sodium silicate applied reacts with the powdered serpentine to form a hard and water-insoluble complex sodium-magnesium silicate exterior coating. Though I am not certain, the apparent chemical reaction is believed to be as follows:

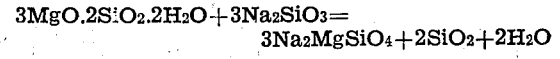

$$3MgO.2SiO_2.2H_2O + 3Na_2SiO_3 = 3Na_2MgSiO_4 + 2SiO_2 + 2H_2O$$

In the improved and preferred method of this invention of manufacture of the novel colored granules with their insoluble silicate coating there is first provided as a hard, weather-resistant base for the colored granules, particles of material, which may be natural or artificial, such as sand, quartz, gravel, or rock, hereinbefore mentioned, or blast-furnace slag, burned clay or shale, including crushed brick or the like, any or all of which provide a substantially non-reactive or relatively inert base material, or, if they are reactive, do not affect or interfere with the accomplishment of my objects. If the color of the granular base is satisfactory, it may simply be provided with the clear coating of this invention without pigment.

In the preferred practice of the process, the base granules are first mixed with serpentine in a powdered and dust-like condition (100% passing a 200 mesh screen) and, upon being substantially agitated or tumbled with the granules, the powder coats or covers the entire exterior surface of the particles. To the serpentine powder, any suitable color pigment may be added, or it may be introduced later in the process. The particles thus coated are then supplied with a coating of an aqueous solution of silicate of soda to which any suitable coloring material may be added, though the dry coloring material, as just mentioned, may be mixed with the powdered serpentine instead. The granules thus coated are dried and put through a kiln at 700° F., or somewhat higher, preferably 1000° F., or even 1200° F. Upon such firing, the after-applied sodium silicate reacts with the powdered serpentine to form in situ an insoluble coating.

Proportions which have been found entirely suitable in an example of the preferred practive of the invention are as follows:

| | Lbs. |
|---|---|
| Base granules | 2000 |
| Serpentine (finely powdered) | 30 |
| Silicate of soda "N" (approximately 41° Bé.) | 60 |
| Chrome green oxide | 14 |

There is thus produced a substantially non-blooming granule of excellent color inasmuch as the powdered serpentine is substantially neutral in color and does not white the natural color of the pigment (if employed) applied to the granules, nor does it obscure the natural color of the granules if no pigment is used. Though in the ordinary practice of this invention only sodium silicate is employed, it is contemplated that a chemically equivalent silicate such as potassium silicate may be substituted therefor, and accordingly, come within the scope of the appended claims.

Having described my invention, I claim:

1. The method of coating granules of the class described which consists in first coating the same with finely powdered serpentine, then applying to the granules thus coated an aqueous coating of sodium silicate, and finally heating said granules to a temperature sufficiently high to react said coatings in situ inter se and produce on said granules a hard, insoluble, weather-proof non-blooming exterior coating.

2. The method of coating granules of the class described which consists in first coating the same with finely powdered serpentine, then applying to the granules thus coated an aqueous coating of sodium silicate, one of said coatings having therein a coloring pigment, and finally heating said granules to a temperature sufficiently high to react said coatings in situ inter se and produce on said granules a hard, insoluble, colored exterior non-blooming coating.

3. The method of coating granules of the class described which consists in first coating colored base granules with finely powdered serpentine, then applying to the granules thus coated an aqueous coating of sodium silicate, and finally heating said granules to a temperature sufficiently high to react said coatings in situ inter se and produce on said granules a hard, insoluble, exterior non-blooming coating without substantially obscuring the colored base granules.

4. The method of coating granules of the class described which consists in first coating the same with finely powdered serpentine, then applying to the granules thus coated an aqueous coating of sodium silicate, one of said coatings having therein a coloring pigment, and finally heating said granules to a temperature of from 450° to 1200° F. to react said coatings in situ inter se and produce on said granules a hard, insoluble, colored exterior non-blooming coating.

5. As a new article of manufacture, roofing granules of the class described having on the exterior thereof a hard, substantially non-blooming, insoluble coating, said coating consisting substantially of pigment and the reaction product of finely powdered serpentine and sodium silicate, and being substantially free from discoloring water-soluble salts.

6. As a new article of manufacture, roofing granules of the class described having on the exterior thereof a hard, substantially non-blooming, insoluble colored coating, said coating consisting substantially of pigment and the reaction product of finely powdered serpentine and sodium silicate, and being substantially free from discoloring water-soluble salts.

7. As a new article of manufacture, roofing granules of the class described comprising a colored granule base and having on the exterior thereof a hard, substantially non-blooming, insoluble coating not substantially obscuring said colored granule base, said coating consisting substantially of the reaction product of finely powdered serpentine and sodium silicate, and being substantially free from discoloring water-soluble salts.

8. As a new article of manufacture, roofing granules of the class described comprising a naturally colored granule base and having on the exterior thereof a hard, substantially non-blooming, insoluble colored coating through which the colored granule base shows, said coating consisting substantially of pigment and the reaction product of finely powdered serpentine and sodium silicate, and being substantially free from discoloring water-soluble salts.

9. As a new article of manufacture, roofing granules of the class described comprising a non-reactive granule base and having on the exterior thereof a hard, substantially non-blooming, insoluble coating, said coating consisting substantially of the reaction product of finely powdered serpentine and sodium silicate, and being substantially free from discoloring water-soluble salts.

EDWIN M. LINES.